(12) United States Patent
Lin

(10) Patent No.: US 10,995,897 B2
(45) Date of Patent: May 4, 2021

(54) COMPOSITE STAND STUD

(71) Applicant: Chien-Ting Lin, Santa Fe Springs, CA (US)

(72) Inventor: Chien-Ting Lin, Santa Fe Springs, CA (US)

(*) Notice: Subject to any disclaimer, the term of this patent is extended or adjusted under 35 U.S.C. 154(b) by 0 days.

(21) Appl. No.: 16/596,970

(22) Filed: Oct. 9, 2019

(65) Prior Publication Data
US 2020/0116294 A1 Apr. 16, 2020

(30) Foreign Application Priority Data
Oct. 11, 2018 (CN) .......................... 201821649246.1

(51) Int. Cl.
*F16M 11/04* (2006.01)

(52) U.S. Cl.
CPC ................................... *F16M 11/04* (2013.01)

(58) Field of Classification Search
CPC ......... F16M 11/04; F16M 11/02; F16B 7/042; F16B 19/02; F16B 37/145; F16B 35/005; F16B 35/00; F21V 17/12; F21V 21/12
USPC .................. 248/121, 178.1, 183.1, 187.1
See application file for complete search history.

(56) References Cited

U.S. PATENT DOCUMENTS

| | | | | |
|---|---|---|---|---|
| 7,281,693 | B2* | 10/2007 | Chou | F16M 11/14 248/179.1 |
| 8,910,914 | B2* | 12/2014 | Bigeh | H04R 1/08 248/288.31 |
| 8,979,055 | B2* | 3/2015 | Chu | F16M 11/14 248/288.31 |
| 9,573,268 | B2* | 2/2017 | Azhocar | F41C 23/14 |
| 9,718,182 | B2* | 8/2017 | Azhocar | B25G 3/36 |
| D801,315 | S * | 10/2017 | Kallas | D14/229 |
| 9,982,696 | B1* | 5/2018 | Hennessey | F16M 11/04 |
| 10,433,639 | B2* | 10/2019 | Hennessey | H04R 1/08 |
| 2001/0017339 | A1* | 8/2001 | Brotz | F16M 11/14 248/187.1 |
| 2018/0283599 | A1* | 10/2018 | Yanchelik | F16M 7/00 |
| 2020/0116294 | A1* | 4/2020 | Lin | F16M 11/04 |

* cited by examiner

*Primary Examiner* — Muhammad Ijaz
(74) *Attorney, Agent, or Firm* — Lin & Associates Intellectual Property, Inc.

(57) ABSTRACT

A composite stand stud includes a body portion, a screw and a tubular member. The body portion includes a support platform, a support body, and a connecting portion. A diameter of the support platform is larger than a diameter of the support body, and two ends of the support body are respectively connected to the support platform and the connecting portion. A diameter of the screw is smaller than a diameter of the support body, and one end of the screw is defined as an embedded end disposed in the connecting portion of the body portion, and the other end thereof is defined as a penetrating end penetrating from a center of the support platform to an outside of the body portion. The screw and the support platform are perpendicular to each other. The tubular member is wrapped around an outer edge of the support body.

8 Claims, 14 Drawing Sheets

COMPOSITE STAND STUD

CROSS-REFERENCE TO RELATED APPLICATION

This application claims the priority of Chinese patent application No. 201821649246.1, filed on Oct. 11, 2018, which is incorporated herewith by reference.

BACKGROUND OF THE INVENTION

1. Field of the Invention

The present invention relates to a stand stud, in particular a composite stand stud having a tubular member.

2. The Prior Arts

In order for stabilization, robustness and durability to connect a conventional stand stud to an equipment, the conventional stand stud is made of all-metal materials, such as iron, aluminum and zinc. However, when the stand stud is used to connect the equipment such as a camera or a video recorder, in order to avoid an abutment surface of the equipment being damaged by the friction of the stand stud, the conventional solution is to install a buffer material of a plastic or other material on the stand stud.

The conventional stand stud is generally not made of all-plastic materials. If the stand stud is made of plastic materials, the damage to equipment can be avoided. The disadvantage thereof is that the stand stud is limited in use. For example, if the equipment is heavier or larger, it is easier to be broken. When the screw is used to fix the equipment on the stand stud, the stand stud is easy to be worn.

SUMMARY OF THE INVENTION

In order to overcome the wear and broken problem of the conventional stand stud and the wear problem of the equipment caused by the material of the conventional stand stud, the present invention provides a composite stand stud, in which different parts of the stand stud are made of different materials. The body portion of the composite stand stud may be made of plastic. When the support platform is docked with the equipment, the equipment will not be worn. The screw disposed in the center of the body portion is made of metal material, which can increase the strength of the composite stand stud and avoid breakage. The periphery of the support body is provided with a tubular member of metal material to prevent the support platform from being worn by the fixing screws of the equipment, facilitate the user to use, and increase productivity and reduce costs The present invention provides a composite stand stud, comprising: a body portion, a screw and a tubular member. The body portion includes a support platform, a support body, and a connecting portion. A diameter of the support platform is larger than a diameter of the support body, and two ends of the support body are respectively connected to the support platform and the connecting portion. A diameter of the screw is smaller than a diameter of the support body, and one end of the screw is defined as an embedded end, and the other end thereof is defined as a penetrating end. The embedded end is disposed in the body portion, and the penetrating end penetrates from a center of the support platform to an outside of the body portion. The screw and the support platform are perpendicular to each other. The tubular member is wrapped around an outer edge of the support body.

Preferably, the embedded end of the screw has a screw head.

Preferably, an inner portion of the tubular member has an internal thread.

Preferably, one end of the tubular member extends into the connecting portion.

Preferably, one end of the tubular member is folded outwardly to form an everted plane, the everted plane is perpendicular to the tubular member, and the everted plane abuts against the support platform.

The present invention has the advantageous effects that the present invention uses different materials on various parts of the stand stud based on desires, and then increases the strength of the stand stud by using a screw and a tubular member respectively, and the plastic material is used for the body portion to prevent the support platform from wearing the equipment, and increase productivity and reduce costs.

BRIEF DESCRIPTION OF THE DRAWINGS

The present invention is further described below in conjunction with the accompanying drawings and embodiments.

DETAILED DESCRIPTION OF THE PREFERRED EMBODIMENT

Hereinafter, the embodiments of the present invention will be described with reference to FIGS. 1 to 7. This description is not intended to limit the embodiments of the present invention, but is one of the embodiments of the present invention.

Figure 1:
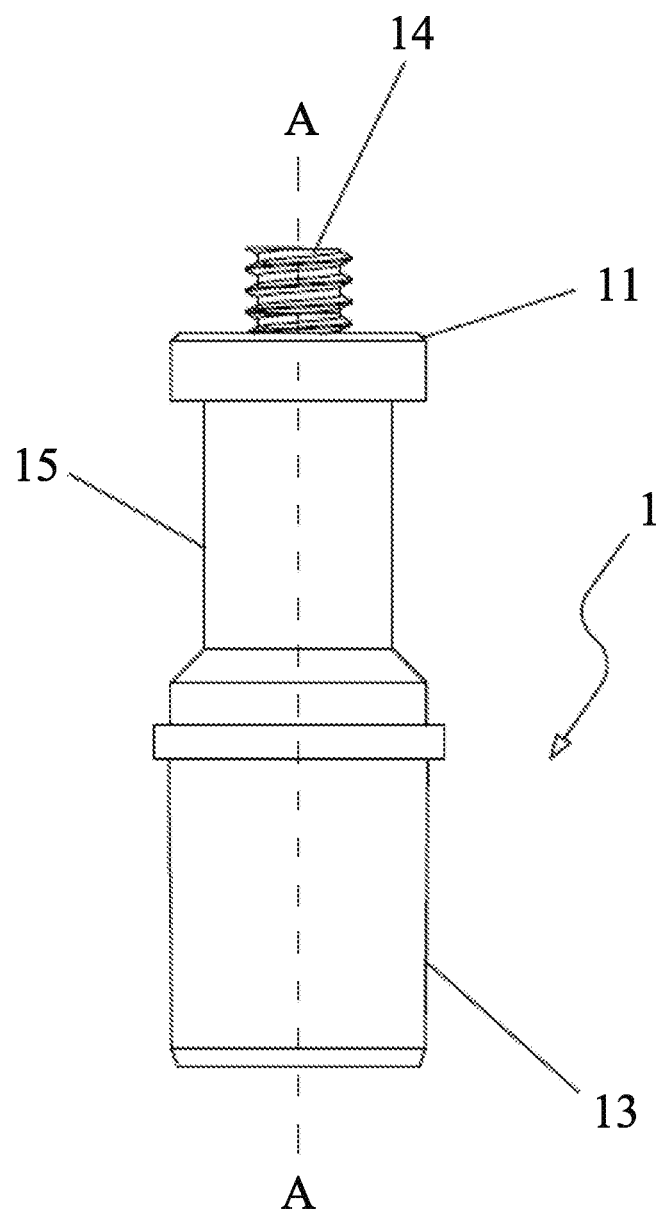
FIG. 1 is a schematic view showing the appearance of the first embodiment of the present invention.
Figure 2:
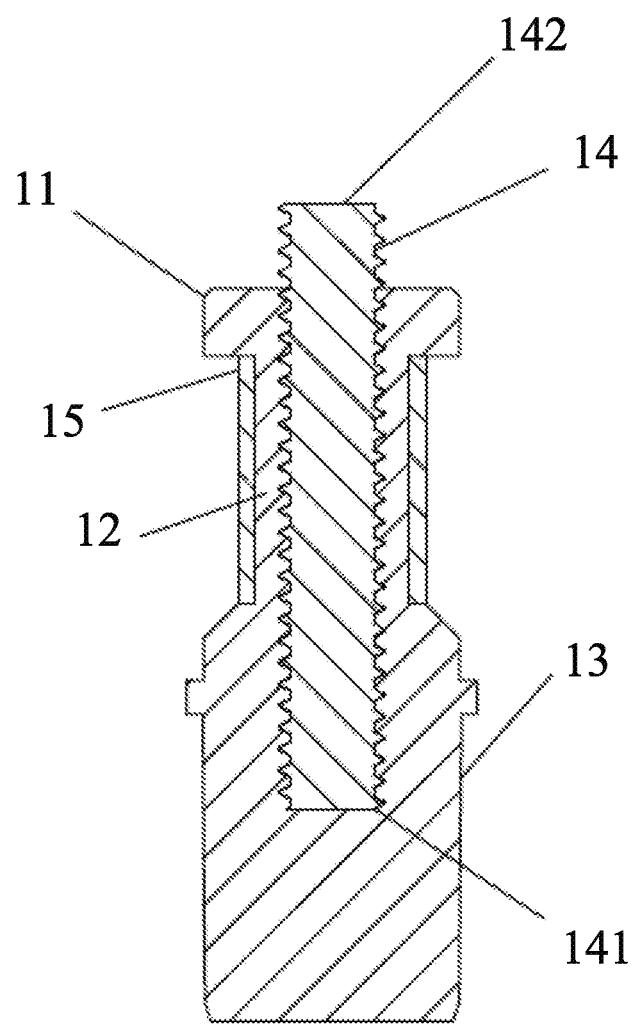
FIG. 2 is a sectional view taken along a line A-A of FIG. 1 according to the first embodiment of the present invention.
Figure 3:
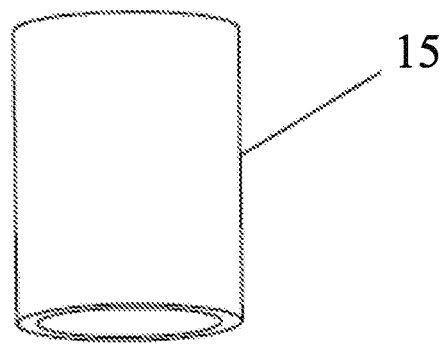
FIG. 3 is a schematic view of the tubular member according to the first embodiment of the present invention.

As shown in FIG. 1 to FIG. 3, a composite stand stud according to the first embodiment of the present invention includes: a body portion 1, a screw 14 and a tubular member 15. The body portion includes a support platform 11, a support body 12, and a connecting portion 13. A diameter of the support platform 11 is larger than a diameter of the support body 12, and two ends of the support body 12 are respectively connected to the support platform 11 and the connecting portion 13. A diameter of the screw 14 is smaller than a diameter of the support body 12. One end of the screw 14 is defined as an embedded end 141, and the other end thereof is defined as a penetrating end 142. The embedded end 141 is disposed in the connecting portion 13 of the body portion 1, and the penetrating end 142 penetrates from a center of the support platform 11 to an outside of the body portion 1. The screw 14 and the support platform 11 are perpendicular to each other. The tubular member 15 is wrapped around an outer edge of the support body 12.

FIG. 1 and FIG. 2 respectively are a schematic view showing appearance and a sectional view, taken along the line A-A in FIG. 1, of the composite stand stud according to the first embodiment of the present invention. The body portion 1 includes the support platform 11, the support body 12, and the connecting portion 13. The diameter of the support platform 11 is larger than the diameter of the support body 12, and the two ends of the support body 12 respectively are connected to the support platform 11 and the connecting portion 13. As shown in FIG. 2, one end of the screw 14 is defined as the embedded end 141, and the other end thereof is defined as the penetrating end 142. The embedded end 141 is disposed in the connecting portion 13 of the body portion 1, and the penetrating end 142 penetrates from the center of the support platform 11 to an outside of the body portion 1. The screw 14 and the support platform 11 are perpendicular to each other. As shown in FIG. 3, the tubular member 15 is wrapped around an outer edge of the support body 12. The body portion 1 may be made of a non-metallic material to prevent the support platform 11 from wearing the equipment. The screw 14 may increase the strength of the body portion 1 so that the body portion 1 is not easily broken. The tubular member 15 is made of metal to prevent the screws of the equipment from directly wearing the support body 12.

The appearance of the second embodiment to the fourth embodiment of the present invention are the same as that of the first embodiment, and the differences of the sectional views of the respective embodiments will be described below.

Figure 4:
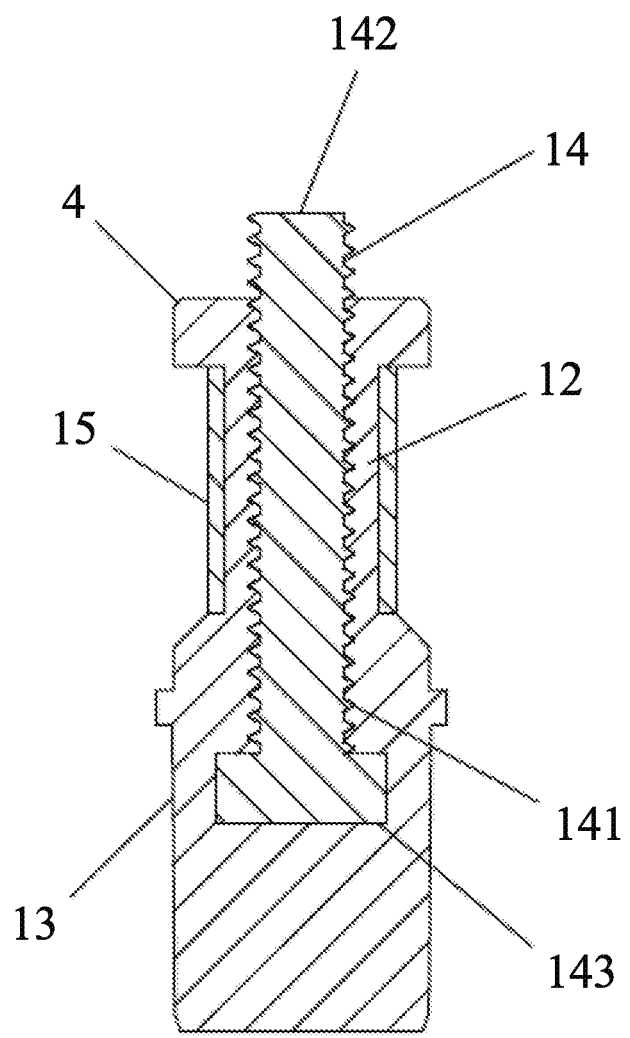
FIG. 4 is a sectional view of the second embodiment of the present invention.

FIG. 4 is a sectional view of the second embodiment of the present invention. The embedded end 141 of the screw 14 has a screw head 143. A diameter of the screw head 143 is larger than the diameter of the screw 14, and the diameter of the screw head 143 is smaller than a diameter of the connecting portion 13. The screw head 143 may have various shapes, such as a hexagon or a quadrangle, in order to prevent the screw 14 from being forced to rotate.

Figure 5:
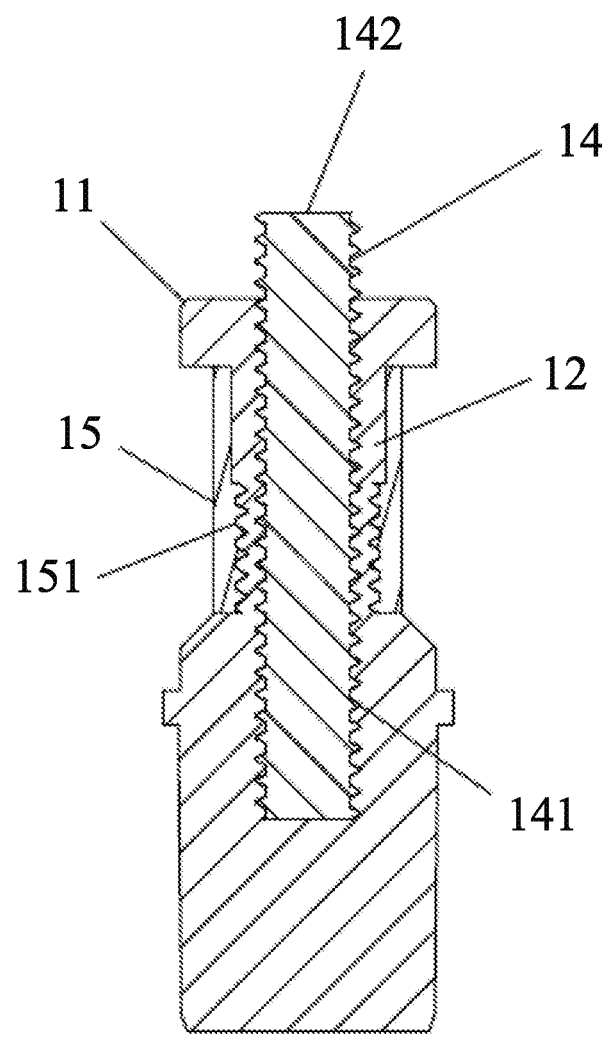
FIG. 5 is a sectional view of the third embodiment of the present invention.

FIG. 5 is a sectional view of the third embodiment of the present invention. An inner portion of the tubular member 15 has an internal thread 151. The internal thread 151 is embedded in the support body 12 to avoid the tubular member 15 and the support body 12 rotating relative to each other.

Figure 6:
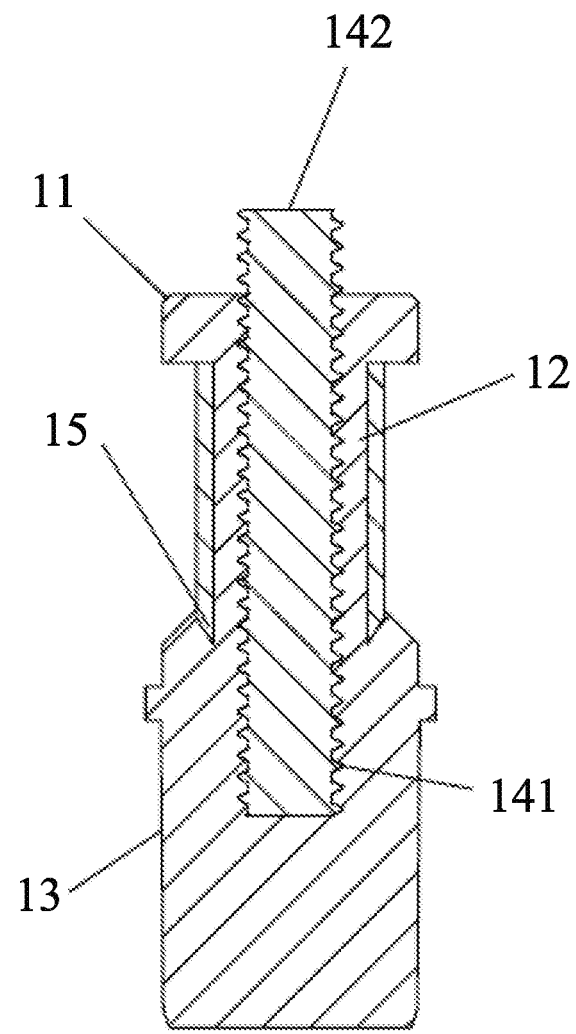
FIG. 6 is a sectional view of the fourth embodiment of the present invention.

FIG. 6 is a sectional view of the fourth embodiment of the present invention. One end of the tubular member 15 extends into the connecting portion 13 so that the tubular member 15 is embedded with the body portion 1.

Figure 7A:
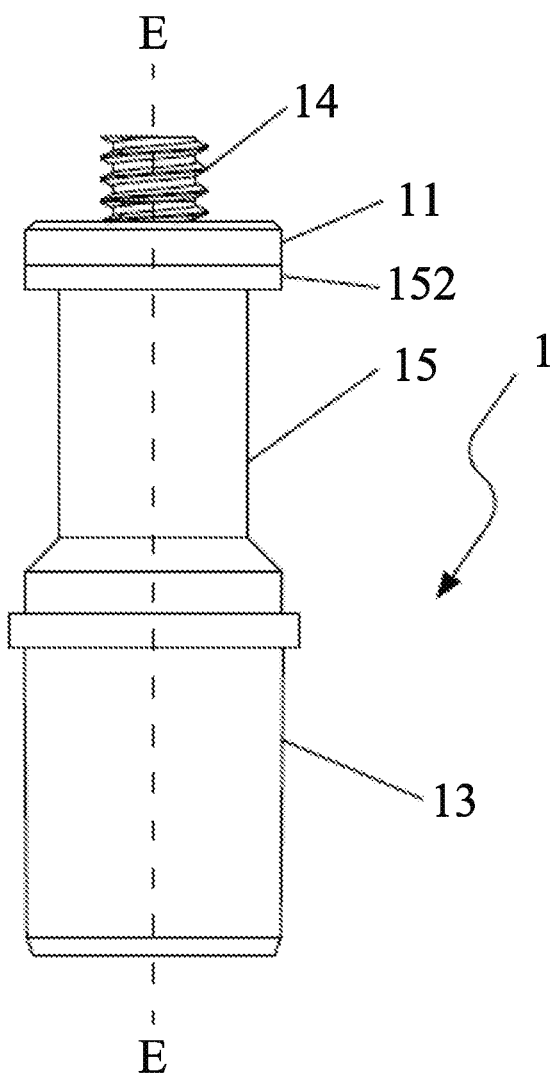
FIG. 7A is a schematic view showing the appearance of the fifth embodiment of the present invention.
Figure 7B:
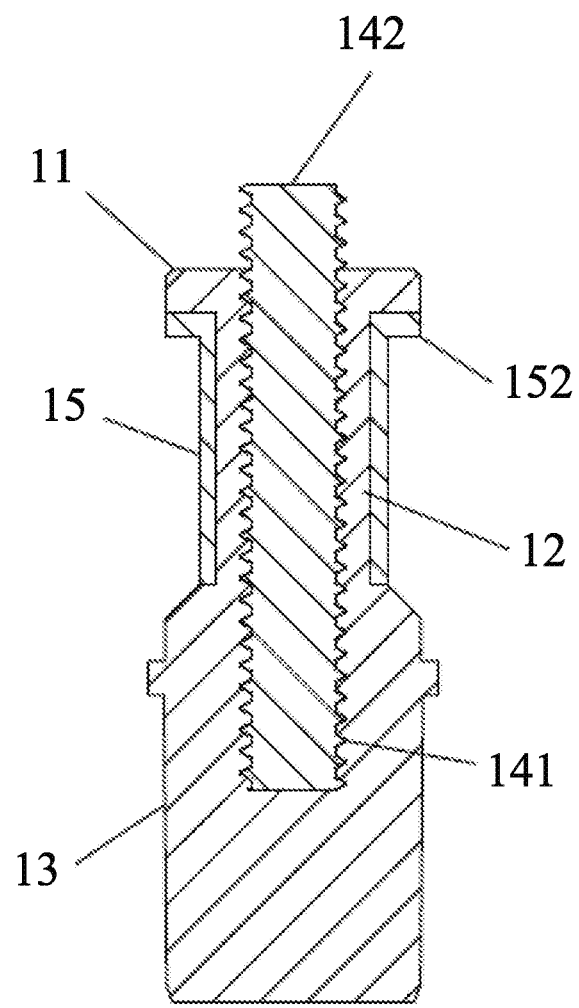
FIG. 7B is a schematic view taken along a line E-E of FIG. 7A according to the fifth embodiment of the present invention.
Figure 7C:
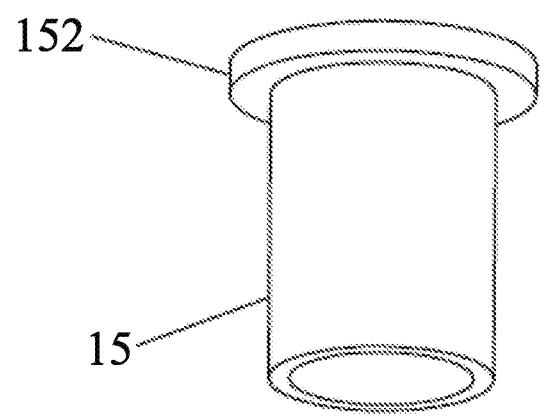
FIG. 7C is a schematic view of the tubular member according to the fifth embodiment of the present invention.

FIG. 7A to FIG. 7C respectively are a schematic view, and a schematic sectional view, taken along the line E-E of FIG. 7A, of the fifth embodiment of the present invention, and a schematic view of the tubular member 15. One end of the tubular member 15 is folded outwardly to form an everted plane 152. The everted plane 152 is perpendicular to the tubular member 15, and the everted plane 152 abuts against the support platform 11. The everted plane 152 of the present embodiment may increase the supporting force of the support platform 11.

Figure 8:
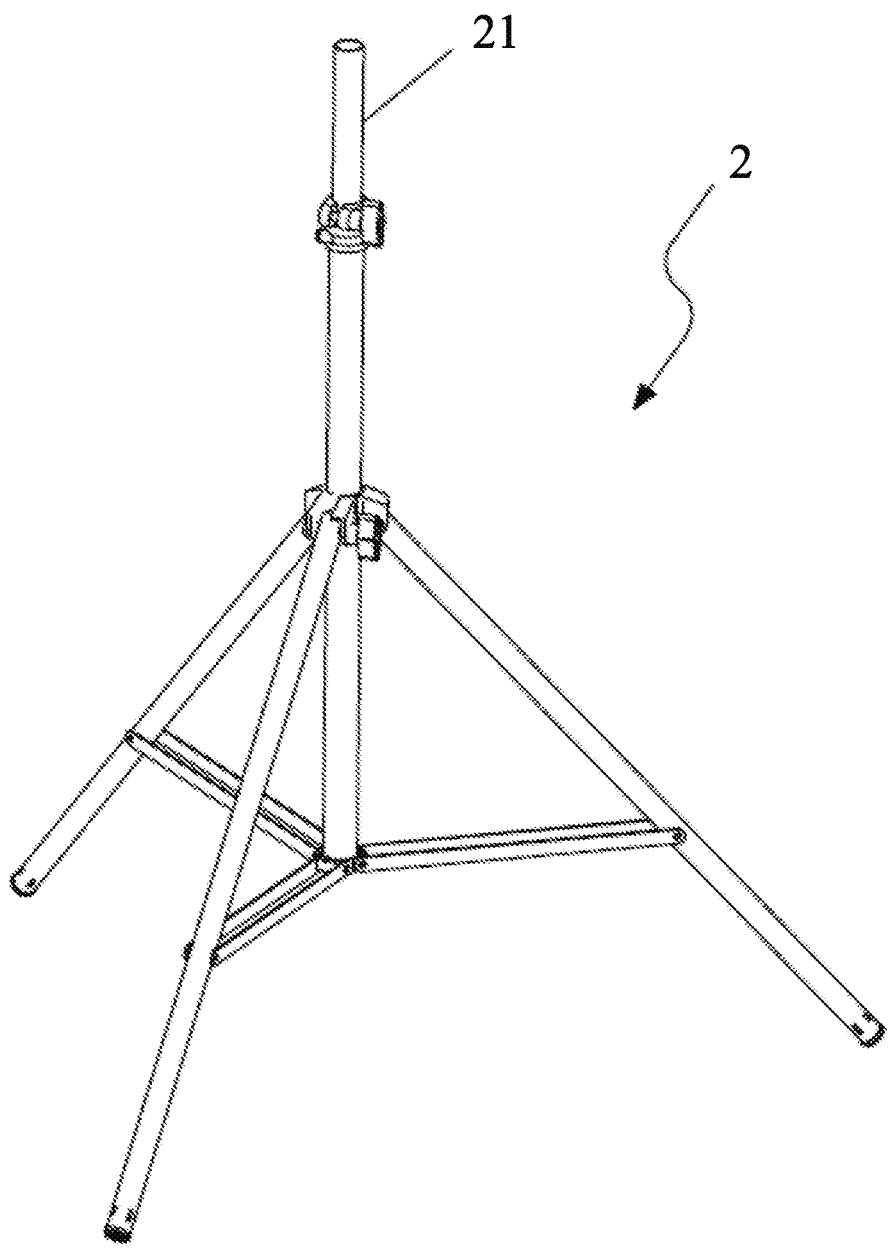
FIG. 8 is a schematic view showing a bracket according to the sixth and the seventh embodiments of the present invention.
Figure 9A:
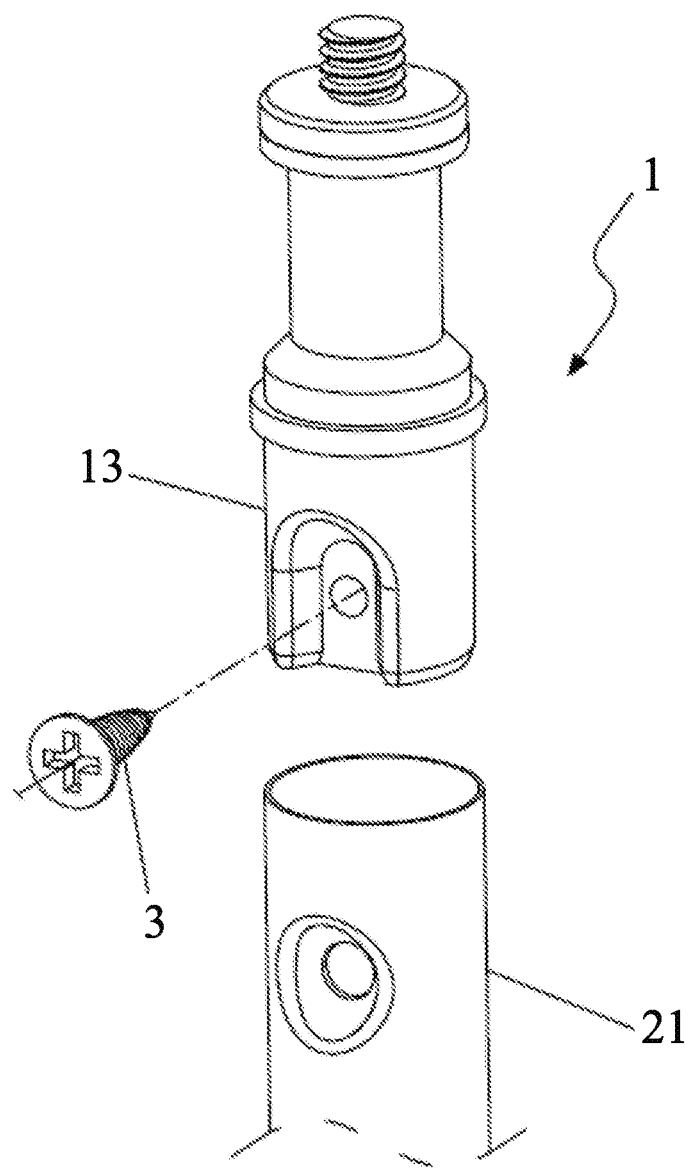
FIG. 9A is a schematic view showing the disassembly of the bracket of the sixth embodiment of the present invention.
Figure 9B:
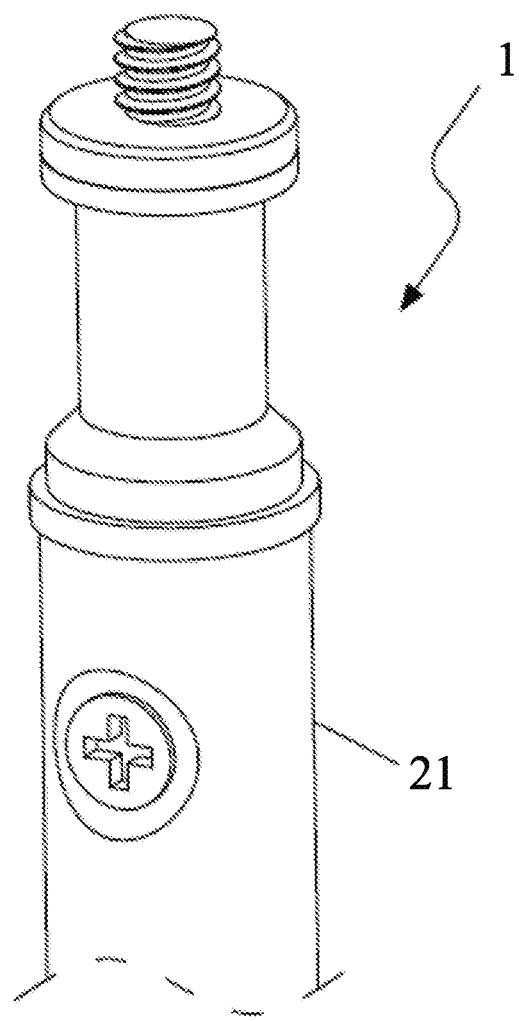
FIG. 9B is a schematic view showing the assembly of the bracket of the sixth embodiment of the present invention.

FIG. 8 to FIG. 9B respectively are a schematic view of a bracket of the sixth embodiment and the seventh embodiment of the present invention, a schematically disassembly view and an assembly view of the sixth embodiment. As shown in FIG. 8 and FIG. 9A, a stand tube 21 is disposed on a bracket 2. As shown in FIG. 9B, the diameter of the connecting portion 13 is smaller than a diameter of the stand tube 21. The connecting portion 13 is inserted into the stand tube 21, and the connecting portion 13 and the stand tube 21 are fixed by a fastening member 3.

Figure 10A:
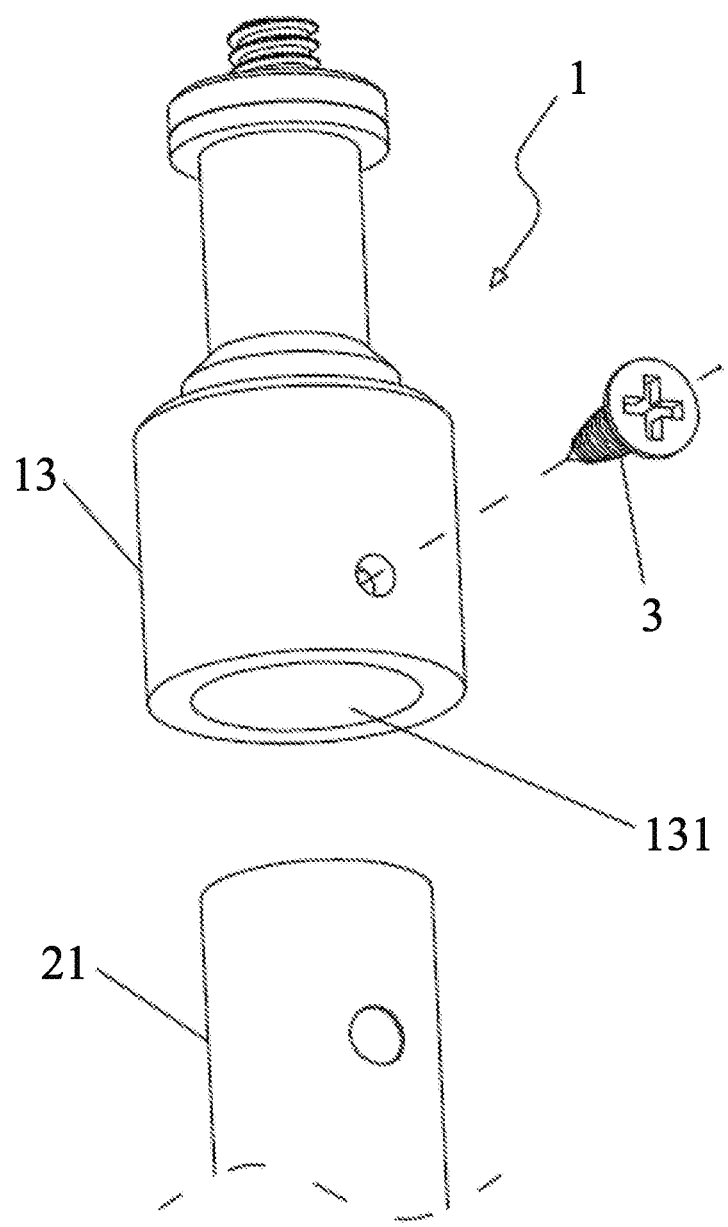
FIG. 10A is a schematic view showing the disassembly of the bracket of the seventh embodiment of the present invention.
Figure 10B:
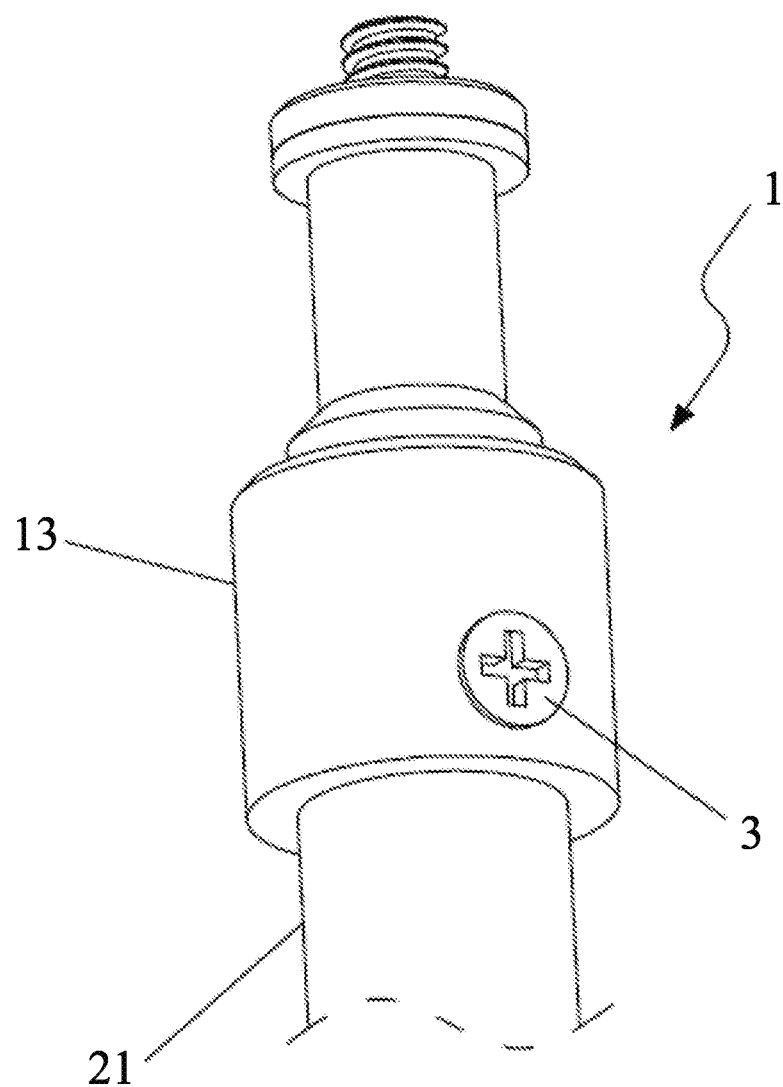
FIG. 10B is a schematic view showing the assembly of the bracket of the seventh embodiment of the present invention.

FIG. 10A and FIG. 10B are schematic views respectively showing the disassembly and the assembly of the seventh embodiment of the present invention. As shown in FIG. 10A, the connecting portion 13 has a receiving portion 131, and a diameter of the receiving portion 131 is larger than the diameter of the stand tube 21. As shown in FIG. 10 B, the stand tube 21 is inserted into the receiving portion 131 of the connecting portion 13, and the connecting portion 13 and the stand tube 21 are fixed by the fastening member 3

The above description is only for explaining the preferred embodiments of the present invention, and is not intended to limit the present invention. Therefore, any form of the changes should be included in the scope of the invention as claimed.

What is claimed is:
1. A composite stand stud, comprising:
a body portion including a support platform, a support body, and a connecting portion, wherein a diameter of the support platform is larger than a diameter of the support body, and two ends of the support body are respectively connected to the support platform and the connecting portion;
a screw, wherein a diameter of the screw is smaller than a diameter of the support body, and one end of the screw is defined as an embedded end, and another end thereof is defined as a penetrating end, and the embedded end is disposed in the connecting portion of the body portion, and the penetrating end penetrates from a center of the support platform to an outside of the body portion, and the screw and the support platform are perpendicular to each other; and
a tubular member wrapped around an outer edge of the support body.

2. The composite stand stud of claim 1, wherein the embedded end of the screw has a screw head.

3. The composite stand stud of claim 1, wherein an inner portion of the tubular member has an internal thread.

4. The composite stand stud of claim 1, wherein one end of the tubular member extends into the connecting portion.

5. A composite stand stud, comprising:
a body portion including a support platform, a support body, and a connecting portion, wherein a diameter of the support platform is larger than a diameter of the support body, and two ends of the support body are respectively connected to the support platform and the connecting portion;

a screw, wherein a diameter of the screw is smaller than a diameter of the support body, and one end of the screw is defined as an embedded end, and another end thereof is defined as a penetrating end, and the embedded end is disposed in the body portion, and the penetrating end penetrates from a center of the support platform to an outside of the body portion, and the screw and the support platform are perpendicular to each other; and a tubular member wrapped around an outer edge of the support body;

wherein one end of the tubular member is folded outwardly to form an everted plane, the everted plane is perpendicular to the tubular member, and the everted plane abuts against the support platform.

6. The composite stand stud of claim 5, wherein the embedded end of the screw has a screw head.

7. The composite stand stud of claim 5, wherein an inner portion of the tubular member has an internal thread.

8. The composite stand stud of claim 5, wherein the one end of the tubular member extends into the connecting portion.

\* \* \* \* \*